Jan. 25, 1927.
E. MILLER
1,615,229
FISHING TACKLE CASE
Original Filed Nov. 14, 1922   2 Sheets-Sheet 1
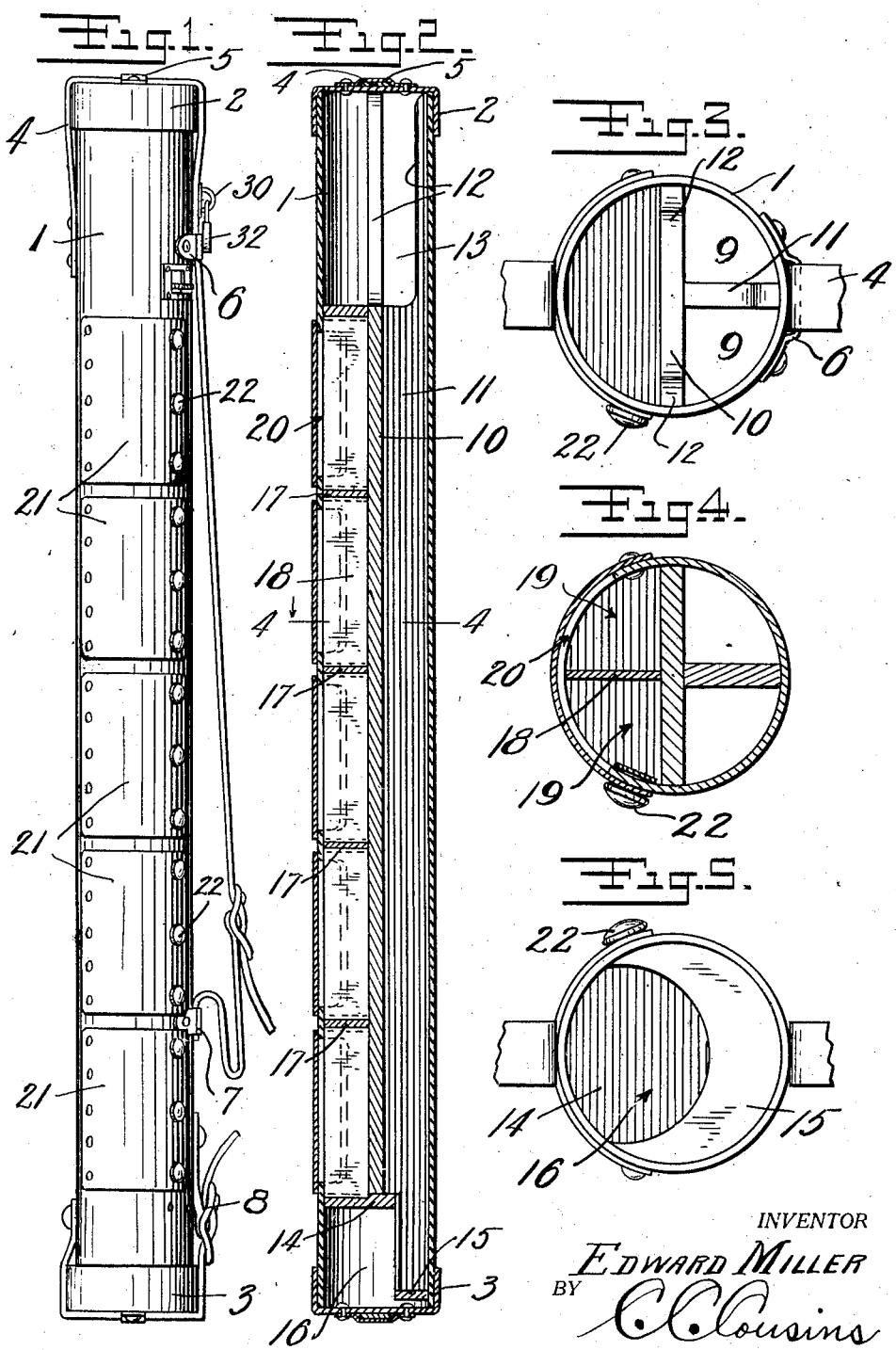
INVENTOR
EDWARD MILLER
BY
C. C. Cousins
ATTORNEY Jan. 25, 1927.  E. MILLER  1,615,229
FISHING TACKLE CASE
Original Filed Nov. 14, 1922   2 Sheets-Sheet 2
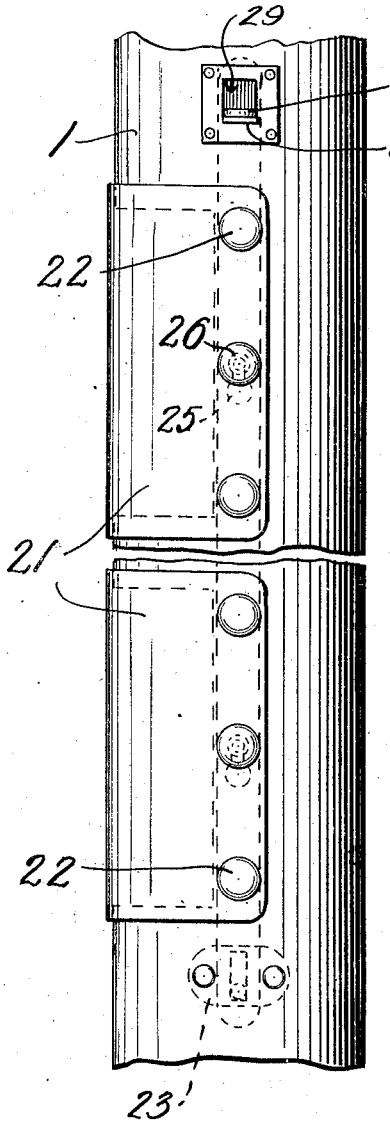
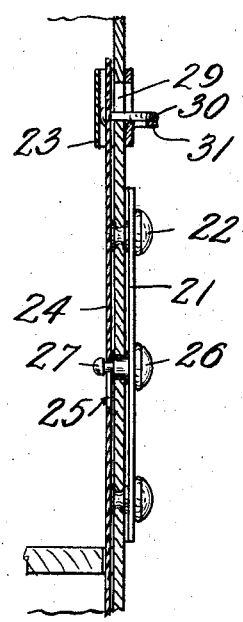
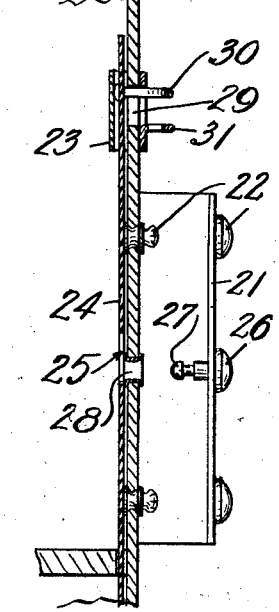
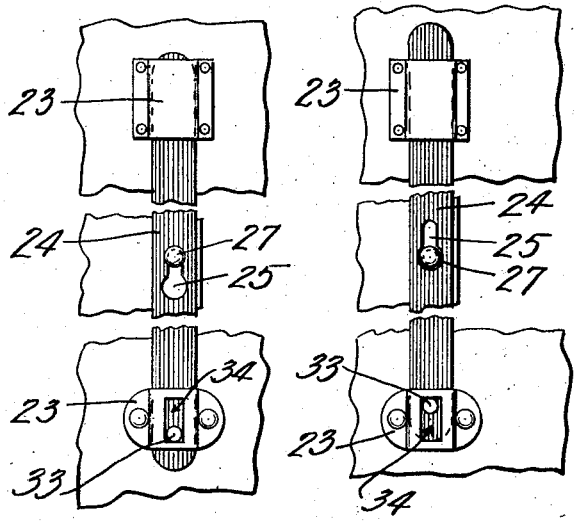
INVENTOR
EDWARD MILLER
BY
C. C. Cousins
ATTORNEY Patented Jan. 25, 1927.

1,615,229

UNITED STATES PATENT OFFICE.

EDWARD MILLER, OF NEW YORK, N. Y.

FISHING-TACKLE CASE.

Refiled for application Serial No. 600,813, filed November 14, 1922. This application filed April 17, 1926.
Serial No. 102,824.

This invention relates to fishing tackle cases.

The object of the invention is to provide an easily portable carrying case, without corners, in which may be separately packed, flies, sinkers, rods, artificial bait, and similar objects necessary and desirable to a complete fishing outfit.

A further object is to provide such case with means for carrying such articles so that any article may be removed without disturbing other articles in the case.

A further object of the invention is to provide means for maintaining the separate compartments closed yet permitting the ready opening of same and to provide one universal locking means for all of such compartments. In the accompanying drawings forming a part hereof is illustrated a form of embodiment of the invention, in which drawings similar reference characters designate corresponding parts and in which:

Figure 1 is a plan view;

Figure 2 is a longitudinal section;

Figure 3 is an end elevation, with the cap removed, looking at the right hand end of Figure 1;

Figure 4 is a transverse section taken approximately along line 4—4 of Figure 2 looking in the direction indicated by the arrow;

Figure 5 is an end elevation, with the cap removed looking at the left hand end of Figure 1;

Figure 6 is a fragmentary detail in enlarged plan;

Figure 7 is a fragmentary detail in enlarged longitudinal section, taken through the locking means showing one of the compartments closed;

Figure 8 is a fragmentary detail in enlarged plan, partly broken away, looking from the inside and showing the locking means closed;

Figure 9 is a fragmentary detail in enlarged longitudinal section, showing one of the compartment covers open and the locking means in open position; and Figure 10 is a fragmentary detail in enlarged plan, partly broken away, looking from the inside of the case, showing the locking means in open position.

Carrying cases having corners and projecting parts catch in the obstacles usually encountered by a fisherman so that the container 1 of this invention is made circular in shape and may be formed of any suitable material, such as fibre, wood, metal or stiffened fabric, so as to present an open ended cylinder, one end of which is closed by a cap 2 and the other end of which is closed by a cap 3, the caps being loosely held in place by friction.

A strap 4 has one end secured to the container and passes over the cap 2 through a loop 5, which loop is secured to the cap 2. The strap 4 is then passed through a loop 6 and has its opposite end secured as at 7. The object of this construction is to provide a means for maintaining the cap 2 always in position and also for carrying the case. The cap 3 is secured in position by means of a similar strap and buckle 8, of ordinary construction.

The container 1 is divided into two longitudinal compartments 9, 9 by means of longitudinal partitions 10 and 11, which partitions terminate short of the length of the container. At one end the partitions 10 and 11 are cut away to leave reinforcing members 12, which reinforce the case 1 at that point and leave a recess 13 to receive any suitable articles such as reels. The opposite end of the partitions carry a transverse partition 14 and a semi-circular partition 15, so as to leave a circular recess 16 in which may be carried a drinking glass or similar receptacle.

The side of the container opposite to the compartments 9, 9 is divided into a plurality of compartments by means of transverse partitions 17 carried by the longitudinal partition 10 and these compartments in turn are subdivided by a longitudinal partition 18; access to the compartments 19 is permitted by means of openings or slots 20 (best shown in Figure 4).

The compartments 19 are covered by covers 21, which covers are individually maintained closed by means of snap fasteners 22, so that access to any particular compartment is readily obtained without opening or disturbing any other compartment.

On the inside of the container 1 and placed in a longitudinal line is a plurality of guide loops 23 and slidably disposed in the guide loops 23 is a flat rod 24 provided with a plurality of key-hole slots 25. Attached to each of the covers 21 is a locking member 26 having a projecting part 27 so arranged on the cover 21 as to pass through an opening 28 formed in the casing 1 immediately over the path of movement of the key-hole slots 25 in the rod 24.

The covers 21 being closed and maintained closed by the fastening members 22, the projecting part 27 of the locking members 26 will pass through the larger portion of the key-hole slots 25. The rod 24 being pushed downward the projecting part 27 will engage under the walls of the reduced portion of the key-hole slots and the covers cannot then be opened (as best illustrated in Figures 7 to 10), the said arrangement forming a universal locking means for all of the covers 21.

The container 1, adjacent the end of the rod 24, is provided with an opening 29 through which projects a staple 30 secured to the rod, affording a means for sliding the rod and cooperating with a second staple 31 secured on the outside of the casing 1 adjacent the opening 29. When the rod 24 is forced downward to the position shown in Figures 7 and 8 a suitable lock 32 of common design may be used to fasten the staples 30 and 31 together so that the rod 24 is locked against movement. The rod 24 is provided with a suitable stop lug 33 working in a slot 34 in the lowermost loop 23 (best shown in Figure 10).

Having thus fully described my invention what I claim is new and desire to secure by Letters Patent is:

1. A case comprising an open-ended container, means for closing the ends of the container, means for dividing the container into longitudinal compartments said dividing means being formed to leave recesses at opposite ends of the container and a transverse, semi-circular partition disposed in one of the recesses.

2. A case comprising an open-ended container, means for closing the ends of the container, means for dividing the container into longitudinal compartments, said dividing means being formed to leave recesses at opposite ends of the container and at one end being extended to form re-inforcing means for that end of the container.

3. A case comprising a container, means for dividing the case into compartments, a hinged cover for each of a series of compartments, a locking member having a projecting part secured to each cover, a slidable cooperating locking member carried by the container and key hole slots arranged in the path of movement of the locking members so that the walls of the slots may engage the projecting parts of the locking members secured on the hinged cover and means for locking the slidable member in one position when the projecting parts are engaged.

4. A case comprising a container, means for dividing the case into compartments, a hinged cover for each of a series of compartments, a locking member having a projecting part secured to each cover, a slidable cooperating locking member carried by the container and carrying slots arranged in the path of movement of the locking members so that the walls of the slots may engage the projecting parts of the locking members secured on the hinged cover and means for maintaining the hinged covers closed so that the projecting part of the locking members are in the path of movement of the slidable member.

5. A case comprising an open ended container, caps removably disposed on the ends of the container, a combined carrying and cap closing means secured to the container, and means for dividing the container into longitudinal and transverse compartments.

6. A case comprising a container, means for dividing the case into a plurality of transverse compartments, the case being provided with an opening over each compartment, a cover for each compartment hinged to the container, means for maintaining the covers in closed position, a locking rod disposed slidably on the wall of the container, cooperating locking means carried by the rod and the covers, a member carried by the slidable rod and arranged to project outside of the container and a member arranged to cooperate with said last named member secured to the outside of the case to receive a locking device.

In testimony whereof I have affixed my signature.

EDWARD MILLER.